United States Patent [19]

Deeran et al.

[11] Patent Number: 5,594,471

[45] Date of Patent: Jan. 14, 1997

[54] INDUSTRIAL TOUCHSCREEN WORKSTATION WITH PROGRAMMABLE INTERFACE AND METHOD

[75] Inventors: Richard J. Deeran, Falmouth; Michael J. Towle, Portland; Steven P. Carll, Scarborough, all of Me.

[73] Assignee: Casco Development, Inc., Portland, Me.

[21] Appl. No.: 332,472

[22] Filed: Oct. 31, 1994

Related U.S. Application Data

[63] Continuation of Ser. No. 819,094, Jan. 9, 1992, abandoned.

[51] Int. Cl.⁶ ........................................................ G09G 5/00
[52] U.S. Cl. ................................................ 345/173; 178/18
[58] Field of Search .............................. 345/173, 87, 156, 345/168; 17/18, 19; 340/407; 350/356

[56] References Cited

U.S. PATENT DOCUMENTS

| | | | |
|---|---|---|---|
| 4,310,839 | 1/1982 | Schwerdt | 348/173 |
| 4,422,732 | 12/1983 | Ditzik | 350/356 |
| 4,771,277 | 9/1988 | Barbee et al. | 340/712 |
| 4,812,830 | 3/1989 | Doering | 340/712 |
| 4,821,029 | 4/1989 | Logan et al. | 178/18 |
| 4,855,725 | 8/1989 | Fernandez | 340/706 |
| 4,885,580 | 12/1989 | Noto et al. | 345/168 |
| 4,947,156 | 8/1990 | Sato et al. | 340/706 |
| 4,952,925 | 8/1990 | Haastert | 340/784 |
| 5,007,085 | 4/1991 | Greanias et al. | 178/18 |
| 5,031,119 | 7/1991 | Dulaney et al. | 340/706 |
| 5,128,672 | 7/1992 | Kaehler | 340/712 |
| 5,300,943 | 4/1994 | Jakobs et al. | 345/173 |
| 5,365,254 | 11/1994 | Kawamoto | 345/157 |

FOREIGN PATENT DOCUMENTS

| | | |
|---|---|---|
| 414566 | 2/1991 | European Pat. Off. . |
| 2139762 | 11/1984 | United Kingdom ................... 345/173 |

OTHER PUBLICATIONS

Emerald Computers, Inc. IC–60 32–Bit Industrial Console, 1991.

*Primary Examiner*—Richard Hjerpe
*Assistant Examiner*—Amare Mengistu
*Attorney, Agent, or Firm*—Testa, Hurwitz & Thibeault, LLP

[57] ABSTRACT

An industrial computer workstation having a display screen and a touchscreen. The touchscreen has a display touch zone that overlaps the display and a border touch zone located outside of the display. An input interface is programmable to define portions of the display touch zone and the border touch zone as user input areas of the touchscreen.

16 Claims, 4 Drawing Sheets

INDUSTRIAL TOUCHSCREEN WORKSTATION WITH PROGRAMMABLE INTERFACE AND METHOD

This is a continuation of application Ser. No. 07/819,094 filed on Jan. 9, 1992 now abandoned.

BACKGROUND OF THE INVENTION

The present invention relates to workstations for industrial use and particularly to workstations incorporating touchscreens.

Computers have been used to monitor certain aspects of industrial operations such as order tracking, employee productivity monitoring and machine status reporting. Typically, an employee interacts with a simple proprietary data input terminal which may be portable or stationary. Many such terminals are generally connected together, allowing for centralized storage and analysis of the data collected. It is also known to place general-purpose personal computers in sealed containers ("ice-chests") for use in industrial environments.

Computers placed in industrial operations must typically face harsh environments. They should be able to operate over large temperature ranges and to withstand shock, moisture and industrial contamination.

SUMMARY OF THE INVENTION

In one general aspect, the invention features an industrial computer workstation with a video display screen and a single-piece touchscreen. The single-piece touchscreen has a display touch zone that overlays the display screen and a border touch zone located outside the perimeter of the display screen. An input interface is programmable to define portions of the display touch zone and the border touch zone as user input areas, and to partition the touchscreen into areas having program-determined sizes and positions. A template overlaying the border touch zone identifies the user input areas of the border touch zone. The workstation may include a general-purpose processor that is user-programmable to run a variety of user application software. The input interface is designed to provide indications of user interaction with the touchscreen to the user application software. The workstation disclosed herein may also include a network port operable to connect the workstation to a network for communication with a central server and/or devices permeable to environmental contaminants. The case which supports the touchscreen and display screen may be reinforced to an extent sufficient to withstand a level of impact significantly higher than that which would normally be encountered in shipping, and the touchscreen is supported by a gasket which provides a seal between the case and the touchscreen that excludes industrial contaminants from the case. Cooling fins may be attached to the case so that the workstation can be cooled primarily by convection.

The workstation of the invention is rugged and simple to operate, but also provides a versatile and powerful development environment. Because the workstation's user interface is programmable to define user input areas in a border touch zone outside of the display screen, a subset of the keyboard or mouse input operations from a general purpose computer may be selected and associated with the user input areas in a desired combination to form a tailored, simplified user interface. This simplified user interface is easy to learn and use, as only the required minimum number of input functions need be provided to the user. The reduced complexity of the workstation may also make it less threatening to the user than would a general-purpose personal computer. User input areas may be provided in the border area without interfering with mouse operations and the like on the display portion of the touchscreen.

Because the size, location and number of buttons available on the border touch zone are programmable, the workstation may be configured to operate in a variety of situations. For example, a few large buttons may be provided for simple "on-off" functions or safety related functions. A larger number of smaller buttons (e.g., a numeric keypad) may also be provided for more detailed user input. Run-time temporary definitions (such as a pop-up keyboard on the display screen) may provide for additional input and allow for system functionality that is closer to that of a general purpose computer.

The definable user inputs on the border touch zone provide a good interface with a standard full-featured computer such as a personal computer. This provides the developer with a large number of features for possible inclusion within an end use application and allows for a familiar type of development environment, which in turn will allow for faster and less expensive training of software developers and/or the selection of less experienced programmers. This is particularly true if the computer used is an industry standard platform (e.g., IBM PC, Apple Macintosh) for which there is a large pool of experienced programmers. Furthermore, a standard computer environment will generally include a certain amount of basic development support, such as an operating system providing system services. A standard environment will also allow for the use of more traditional development tools such as screen editors, assemblers, debuggers and the like. These tools, and even large portions of end use applications such as databases and the like, may be commercially available for industry standard platforms. This allows for rapid, inexpensive and less tedious development. Furthermore, it will be easier to maintain a software program developed with standard tools and applications supported by third party developers. These benefits may be sufficient alone to warrant migration of proprietary workstation software onto the workstation of the invention.

The versatile partitionable touchscreen-based workstation of the invention is particularly well suited for industrial environments. The single-piece touchscreen allows for inexpensive sealing of the workstation to exclude environmental contaminants such as airborne particles or liquids. The inclusion of only the necessary defined input areas allow for a compact design which takes up little valuable factory space and may even be mounted on a vehicle such as a forklift. The resulting compact package may be inexpensively reinforced to withstand high levels of impact.

The removable templates are inexpensive and allow the workstation to be quickly reconfigured to operate in a user-friendly manner with different application software. This may permit a greater degree of automation and/or a reduction in paperwork for a given investment in equipment. This also permits the workstation to be reused in different ways as industrial needs change (e.g., retooling). The combination of the templates and the user defined areas of the border touch zone provide a button metaphor that is easy to understand and integrates well with other equipment in an industrial environment.

BRIEF DESCRIPTION OF THE DRAWING

For a fuller understanding of the nature and objects of the invention, reference should be made to the following detailed description and the accompanying drawings, in which.

DESCRIPTION OF THE INVENTION

Figure 1:
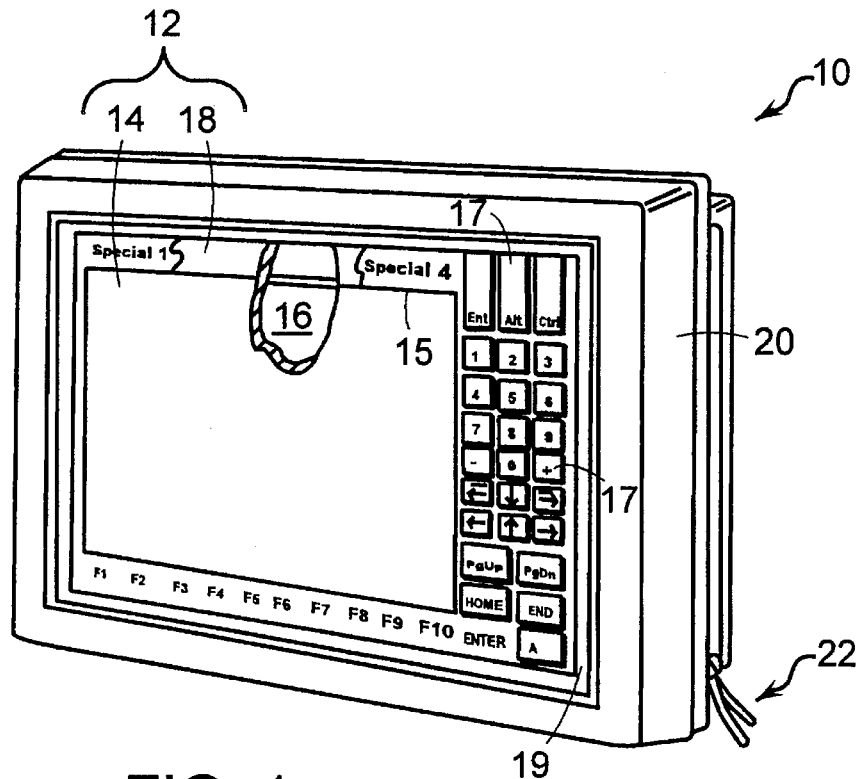
FIG. 1 is a perspective illustration of an industrial touchscreen workstation according to the invention, with portions of the touchscreen and overlay cut away to expose a portion of its underlying display screen.
Figure 2:
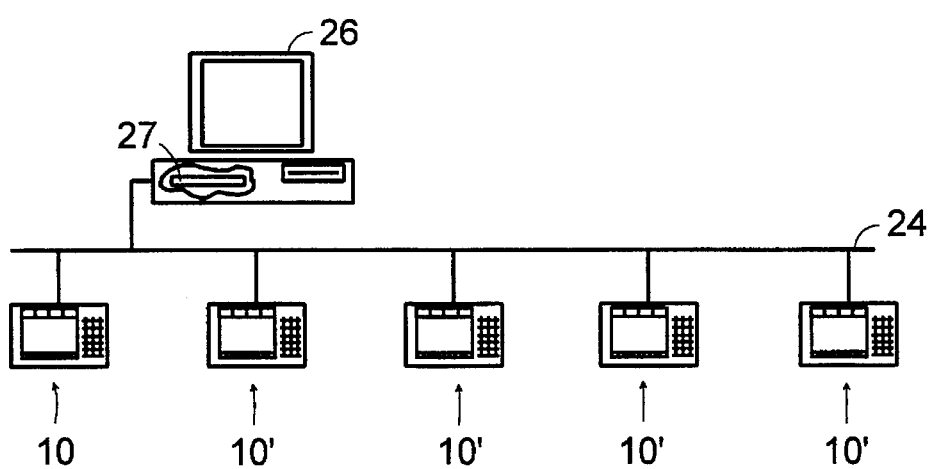
FIG. 2 is a diagram of a network incorporating the workstation of FIG. 1.

Referring to FIGS. 1 and 2, an industrial workstation 10 according to the invention includes a single piece touchscreen 12, which includes a display touch zone 14 that is mounted in front of a display screen 16 and a peripheral or border touch zone 18 that is mounted beyond the perimeter of but peripheral to the display screen 16. A shell (or case) 20 supports the display screen 16 and the touchscreen 12. A gasket 19 seals the touchscreen 12 in place while excluding environmental contaminants such as airborne particles or liquids from the computer system. A template overlay 15 is placed over the border touch zone 18 and includes markings 17 which identify user input areas of the touchscreen 12 outside of the display touch zone 14. From the user's point of view, markings 17 act as labeled buttons for providing input to the workstation. The disclosed workstation differs from the usual personal computer configuration in that it employs the versatile single-piece touchscreen user interface of the invention extending beyond the visible display screen 16, instead of using the more traditional keyboard and mouse.

In one embodiment, the workstation 10 contains an AMD 80386 processor clocked at 20 MHz with associated circuitry and firmware which give it the computing architecture of an IBM-PC with 640×480 resolution VGA graphics. Other architectures are of course usable. The workstation 10 is in a tough cast aluminum shell and may include a network port 22 that may be connected to a network medium 24 linking it to other like 10' and unlike (e.g., 26) devices. Because the workstation can have the computing capability of a standard computer, it may be easily connected to a network of computers 10' and 26 as shown in FIG. 2 by means of a standard network interface card. The workstation may be diskless and boot off of a network server 26 on a popular network such as one available from Novell, of Provo, Utah. Optional storage 27, such as EEROM cards ("electronic disks") may be used as well.

The template overlays 15 may be made of a thin low-glare material that does not interfere with the operation of the touchscreen (e.g., 5 mil satin finish Mylar), and may be colored and/or marked as desired. The gasket 19 grips the Mylar overlay 15 and holds it in place. Mylar also protects the touch screen surface and the markings on it describe the touch zones.

Because of the industrial work environment, the aluminum shell 20 may be built to the NEMA-4× environmental rating for waterproofness and may include cooling fins (not shown) which permit the workstation to be cooled entirely by convection. Although any display screen will work, in one embodiment the display screen may be a liquid crystal display (LCD) whose contrast is controlled by a temperature compensation circuit allowing the workstation to be used over a wide temperature range of 0°–40° C. The workstation can therefore be used in hot, cold or wet environments and may be washed with a hose during normal cleanup. The case in one embodiment is approximately 11"×14"×4" and can hold up to 16 Mb of memory including support for mixed DRAMs. An optional keyboard connector may also be provided, along with a mounting bracket to secure the unit to flat surfaces and poles.

The touchscreen hardware used in interfacing the touchscreen with the workstation is readily available, and may, for example, be provided by Elographics and can include Elographics' Serial Duratouch E261-280 (Interface) and Resistive Screen E264-13.

Figure 4:
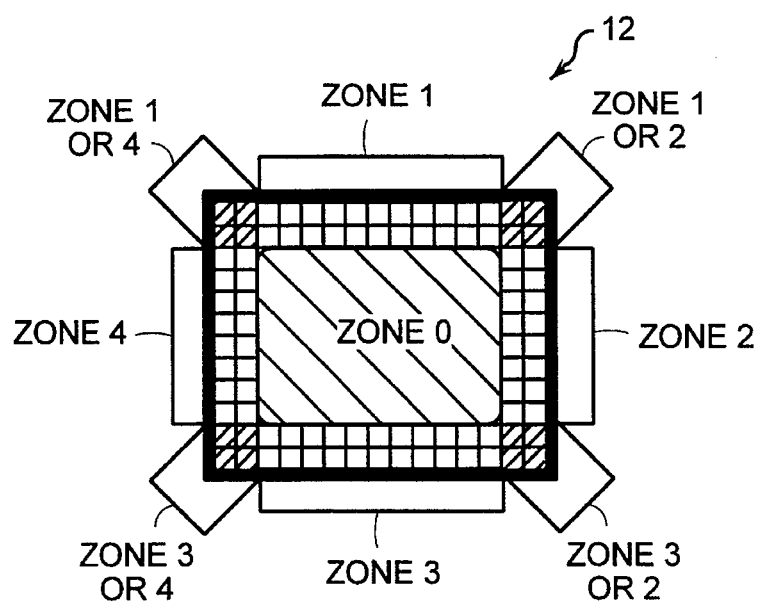
FIG. 4 is a diagram showing the organization of a first embodiment of a multi-zone touch interface for the touchscreen of the workstation of FIG. 1.

In one multi-zone embodiment of the described invention, shown in FIG. 4, the touch screen is divided into five areas, or zones, which can receive touch input. The Windows® Operating System, available from Microsoft, Inc., of Redmond, Wash., has been found to be a useful program for use with the workstation of the invention, in part because of its simple graphical user interface. Briefly and generally, the workstation disclosed herein may be programmed to read touchscreen input within the display touch zone 14 as mouse-type output and touchscreen input from the border touch zone 18 may be read as keyboard-type output. Standard programs, such as CAD programs, spreadsheets, data collection and E-mail programs may be operated using such a system, provided that the collection of drivers, programs and libraries that constitute the input interface 35 (see FIG. 6) between the touchscreen and Windows is properly programmed. The interface is implemented as a Windows® Dynamic Link Library with a hook into a modified Windows® keyboard device driver which will be described in more detail below. Of course, the workstation may run other commercial DOS software or other operating systems, or the workstation may be programmed to run applications specifically developed to run in a defined industrial environment.

Figure 3:
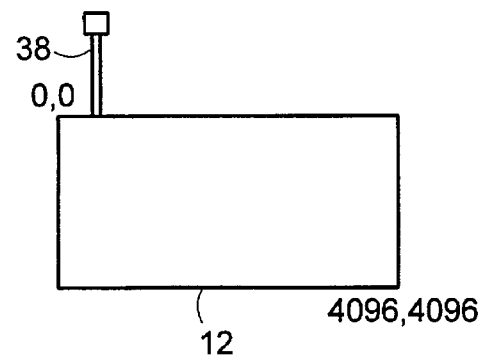
FIG. 3 is a diagram illustrating the coordinate system for the touchscreen of the workstation of FIG. 1.

The standard Elographics touchscreen interface for Windows® assumes that the entire touch area is overlaid on top of the target display screen. The touch area is then calibrated using a calibration module to allow the user to access the entire display area. In the present invention, a special calibration module in the workstation calibrates the multi-zone interface because the coordinate system for the described touch area differs from the coordinate system of a typical Windows® screen. The coordinate system for the touchscreen 12 is illustrated in FIG. 3. (In one embodiment, the touchscreen 12 is installed with its connector 38 running from the upper left side of the touchscreen 12).

In FIG. 4, the area labeled "Zone 0" corresponds to the touch zone 14 which covers the display screen 16. This area is used, for example, to display the Windows® application. The other areas labeled "Zone 1" through "Zone 4" surround the display in the border touch zone 18. These areas can be divided into rows and columns which can then be used to create numeric buttons, other pre-defined buttons, macro function buttons, and user definable buttons. To assist the user in using these buttons, the template overlay 15 will show legends or graphics for each button. The input interface allows for all four of these border areas to be used for touch decoding.

Figure 5:
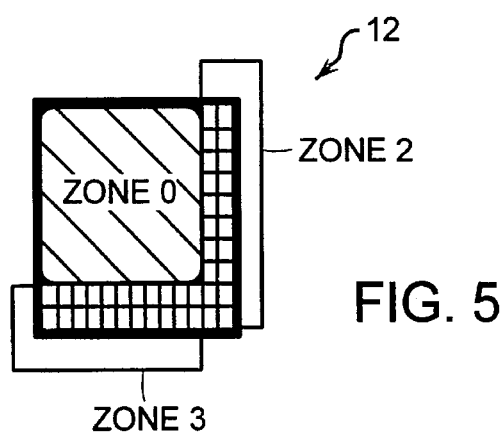
FIG. 5 is a diagram showing the organization of a second embodiment of a multi-zone touch interface for the touchscreen of the workstation of FIG. 1.

In certain applications, there may be a need to have only two border touch zones as shown in FIG. 5. In FIG. 5, Zone 2 can be used for commonly used keys or functions such as CTL, ALT, ESC, numeric keys, cursor movement keys, the ENTER key, and a hot key which invokes a pop-up keyboard application which allows the user to enter alphabetic data in display Zone 0. Zone 3 can contain typical Function keys F1 through F10.

Figure 6:
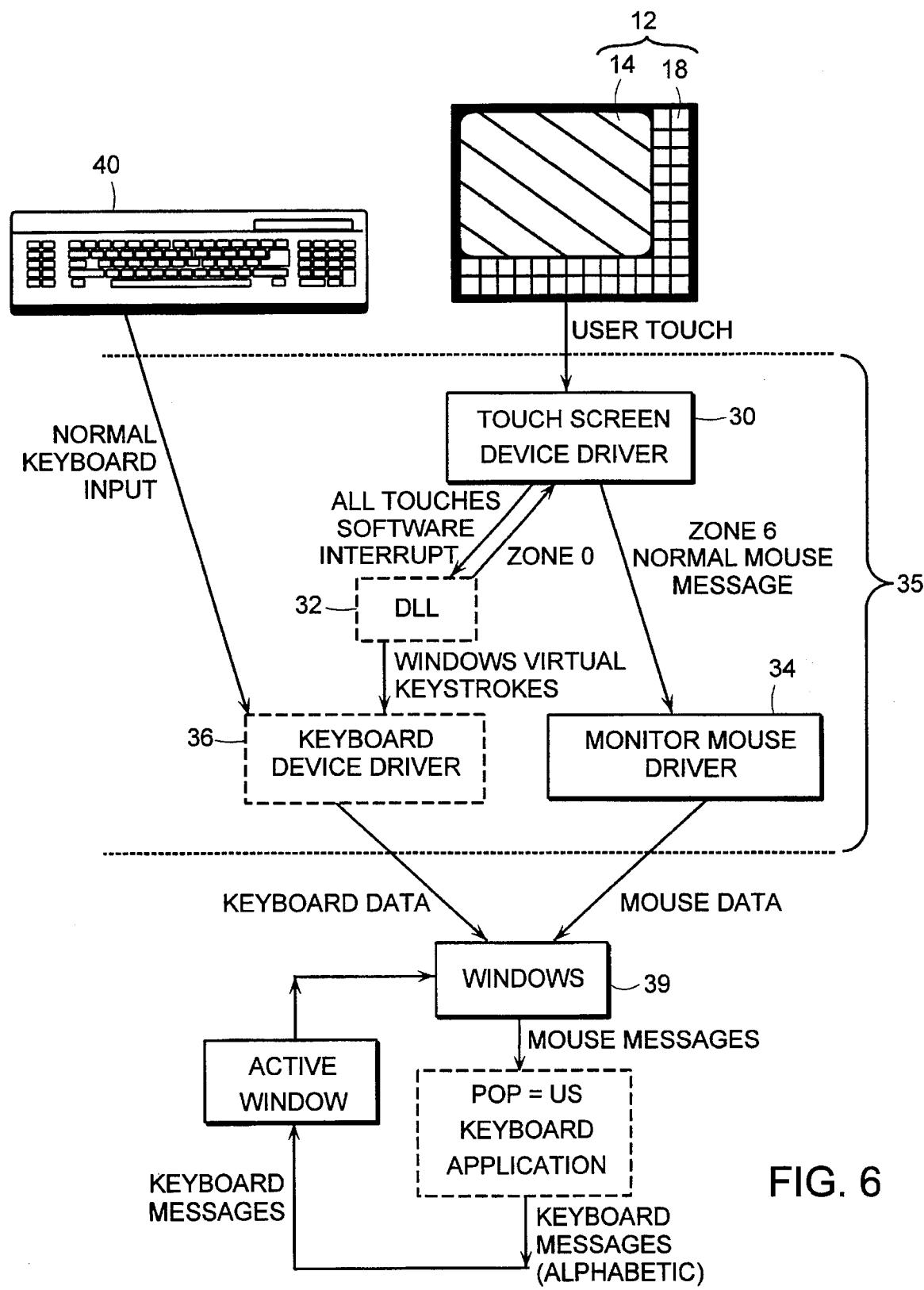
FIG. 6 is a block diagram illustrating the flow of data from the touchscreen of the workstation of FIG. 1 and its optional keyboard to the Windows® operating system.

Referring to FIG. 6, a block diagram illustrating the flow of data from the touchscreen is shown. A Windows® Dynamic Link Library (DLL) 32 and a modified Windows® keyboard device driver 36 interact with the touchscreen device driver 30 to act as an interface between the signals provided by the touchscreen 12 and the application software running on the workstation. The DLL 32 decodes the signals from the touch zones and then calls the modified Windows$^R$ keyboard device driver 36 which sends virtual R keystrokes directly to Windows® 39 as if they had come from a keyboard. This approach insures compatibility with the system's virtual key functions as well as normal application keyboard input.

The keyboard device driver 36 may be a standard Windows$^R$ Device Driver which has been modified to provide access to the direct call which the keyboard device driver 36 makes to Windows® 39 to pass keyboard input. The driver 36 also may support a standard keyboard interface from an optional keyboard 40. The DLL 32 receives raw touch coordinates from the touchscreen device driver 30 via a software interrupt.

Figure 7:
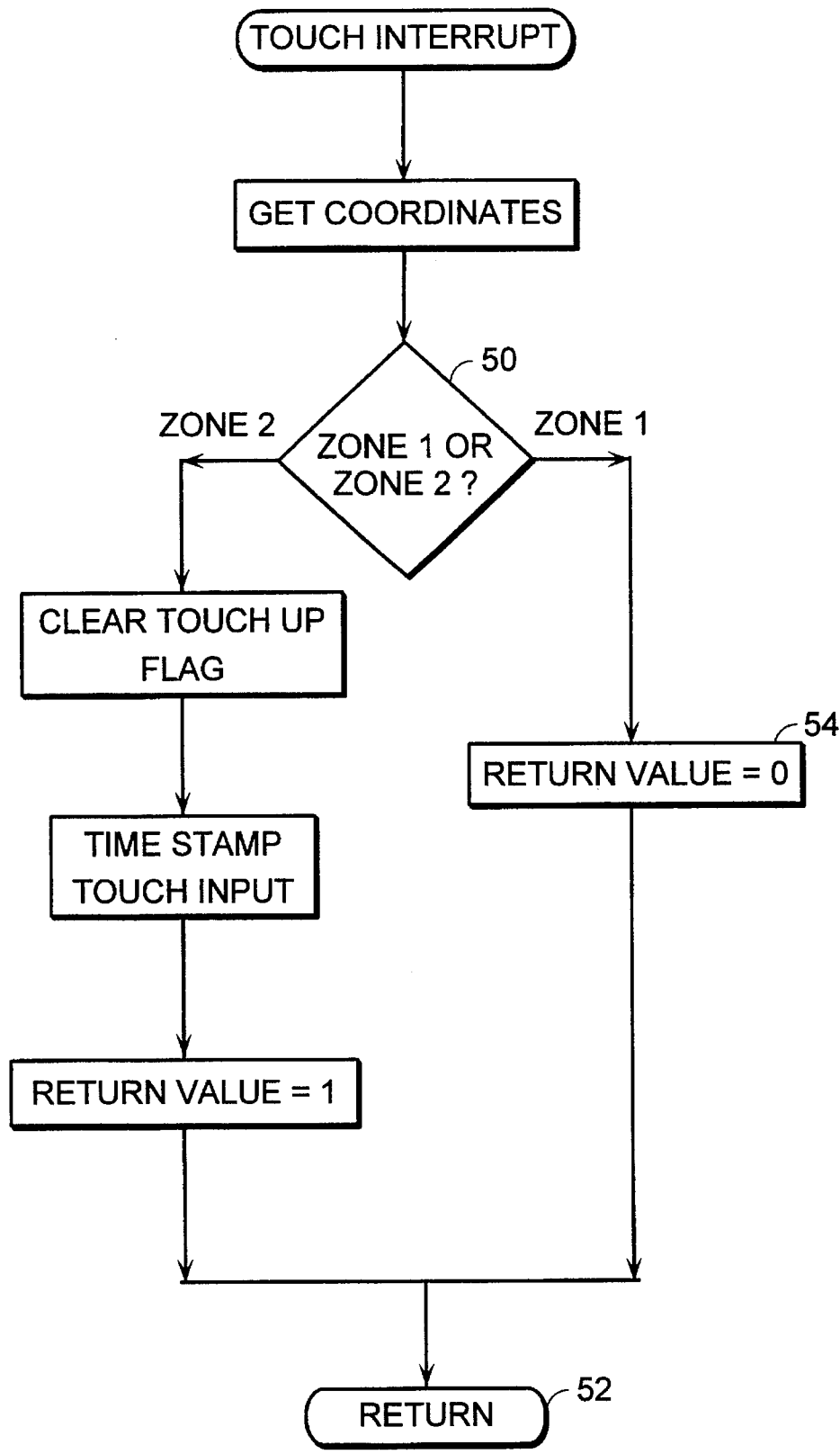
FIG. 7 is a flowchart outlining the operation of the interrupt handler of the workstation of FIG. 1.

Referring also to FIG. 7, if the interrupt handler located in the DLL 32 determines from the coordinates of the touch that a touch was made in Zone 0, for example, it will return from the interrupt with a value of 0, indicating that the touch was not processed by the DLL 32. When the return code is examined by the touchscreen device driver 30, it determines that it must generate a normal call to the monitor mouse driver 34, which will then pass a mouse message to Windows$^R$.

If the DLL 32 determines that a touch was in Zone 2, however, it will clear a TOUCH UP flag, record the time of the touch, and return with a value of 1 to tell the touchscreen device driver 30 that the keyboard device driver 36 processed the touch. The touchscreen device driver 30 will not process the touch any further.

In one embodiment, the DLL 32 determines a touch by determining when a finger has been lifted from the touchscreen (this is the preferred input event type as it provides good input control). This determination is driven by a timer callback which is set up when the DLL is initialized and which determines when there has been a break in the flow of touch information, i.e., when the finger has been lifted. When this happens, the last touch is translated, decoded into a Windows® virtual keystroke, and sent to the modified keyboard device driver 36 via an exported call. These keystrokes will be received from Windows® as if they came from a keyboard.

It is observed that the standard keyboard interface 40 may still be supported, and that a keyboard port may be provided on the workstation 10. Code for a standard keyboard need not be modified because exported calls can be added to support the DLL driver 32.

The functional modules which may be used with the multi-zone interface can include: the Dynamic Link Library which contains multi-zone and Omnis code; a Pop-up Keyboard which is an alphabetic keyboard Windows® application; a specially modified Multi-Zone Calibration Module; the Multi-Zone Calibration Data; and the modified Windows® Keyboard Driver.

The invention may run on a Novell network. In such an embodiment, the functional modules may be implemented as stored files which can be located in the following directories:

| | |
|---|---|
| Keyboard driver | In server's Global Windows$^R$ directory |
| Pop-Up Keyboard | In server's Global Windows$^R$ directory |
| DLL | In server's Global Windows$^R$ directory |
| Calibration Module | In workstation boot directory (or pathed directory) |
| Calibration data | In workstation boot directory |
| Touchscreen driver | In workstation boot directory |

The settings in the configuration file allow the developer to define the configuration of the multi-zone touch areas which are used by the DLL module. The configuration file contains several sections each of which comprise a group of related settings. The following sections can appear in this file:

| SECTION | Effect on DLL |
|---|---|
| [TOUCH] | Enables multi-touch zone interface and allows control of audio feedback for users. |
| [SIZEn] | Enables and defines each of the four touch zones. This includes the number of columns, rows, sizes of the keys, and hot zones for each touch zone. |
| [KEYz_n] | Controls attributes for each key which is defined on the pop-up keyboard. |

The [TOUCH] section may contain settings that affect certain aspects of the Dynamic Link Library including whether the dual zone interface is enabled or disabled; whether the audio feedback is enabled or disabled; and the amount of time to debounce a touch.

The [SIZEn] section, where n=zone1 to zone4, contains settings that affect aspects of the Dynamic Link Library such as: whether the zone is enabled or disabled; the number of rows in the zone; the number of columns in the zone; the hot zone (i.e., the square defined from the center of each key which is sensitive to touch); whether the active area is flush to the full touch area or the edge of the Windows$^R$ display; and the margin (in touch units) which specifies the border between the active Windows® area and the zone being defined.

The [KEYz_n] sections contain settings that affect specific settings for each key (n) which is located on the keyboard defined for zone (z), including: Windows® Virtual Key codes to send to the application when the key is touched; definitions as to whether a key is a shift, alt, or control key; and definitions as to whether a key invokes a pop-up alphabetic keyboard. The keys are ordered starting at the upper left key and going in order by columns and then rows.

The keyboard device driver 36 has been modified by adding to the standard keyboard driver assembler code contained in the Windows® Device Driver Kit, or DDK, an exported call to allow virtual key codes to be sent to Windows® as if they had come from keyboard hardware.

It is observed that the server 26 (FIG. 2) need not be located in an industrial environment and may therefore be non-sealed. It is also possible to use the input interface 35 (FIG. 6) between the touchscreen and Windows® to remove inputs that would normally be relayed to Windows® and thereby "tame" Windows® to make it simpler to use. Telemetry may also be used in connecting the workstation to its network.

The invention may be embodied in other specific forms without departing from the spirit and essential characteristics thereof. Accordingly, the invention is to be defined not by the preceding description, which is intended as illustrative, but by the claims that follow.

What is claimed is:

1. A computer workstation comprising:
   a display including a unitary display screen on which computer-generated visual images are provided and a border area located outside of the display screen, the border area being incapable of displaying said computer-generated visual images;
   a single-piece touch sensitive screen located on the display and dimensioned to cover said display screen and said border area, the touch sensitive screen having:
   a first touch zone covering said display screen;
   a second touch zone covering said border area; and
   a signal output responsive to a touch in said first touch zone or said second touch zone;
   an input interface responsive to said signal output, said input interface being programmable to define portions of said first touch zone and said second touch zone as user input areas; and
   a removable template (i) positioned on the touch sensitive screen and dimensioned to overlay said second touch zone of said touch sensitive screen, (ii) made of a low-glare material so as to not interfere with operation of said touch sensitive screen, and (iii) including printed indicia which function as an array of user selectable buttons for identifying said user input areas of said second touch zone.

2. The workstation of claim 1 further including a general-purpose processor, said processor being able to run any one or more of a plurality of user application software including general-purpose software, and wherein said input interface is operable to provide indications of user interaction with said user input areas to the user application software running on said processor.

3. The workstation of claim 2 further including a network port responsive to said input interface and operable to connect said workstation to a network.

4. The workstation of claim 1 wherein said input interface is programmable to partition said touchscreen into user input areas having user defined sizes and positions with said second touch zone.

5. The workstation of claim 1 further including a reinforced case supporting said touchscreen and said display screen, wherein said case is sealed to exclude industrial contaminants from entering said case.

6. The workstation of claim 5 wherein said touchscreen is a resistive touchscreen, and said workstation further includes a gasket providing a seal between said case and said touchscreen that excludes said contaminants from said case.

7. The workstation of claim 1 wherein said input interface is programmable during operation to define an area of said second touch zone to include user input areas.

8. An industrial computer workstation comprising:
   a reinforced case sealed to exclude industrial contaminants from said case reinforced to an extent sufficient to withstand a level of impact higher than that which would normally be encountered in shipping and office use:
   a display including a unitary display screen, supported by said case, on which computer-generated visual images are provided and a border area located outside of the display screen, the border area being incapable of displaying said computer-generated visual images;
   a single-piece touch sensitive screen located on the display and dimensioned to cover said display screen and said border area, the touch sensitive screen including:
   a display touch zone covering said display screen;
   a border touch zone covering the border area; and
   a touch signal output responsive to said display touch zone and to said border touch zone;
   a gasket supporting said touch sensitive screen in said case, said gasket providing a seal between said case and said touch sensitive screen that excludes said contaminants from said case;
   an input interference contained in said case, said input interface being responsive to said touch signal output of said touch sensitive screen, said input interface being programmable to partition said touch sensitive screen into user input areas of said display touch zone and said border touch zone having programmable sizes and positions, said interface being programmable during operation to define an area of said touch sensitive screen to include user input areas;
   a general-purpose processor contained in said case, said processor being programmable to run user application software including general-purpose software, and wherein said input interface provides indications of user interaction with said user input areas of said much sensitive screen to the user application software running on said processor, said display being responsive to said processor;
   storage for alterable initialization parameters and wherein said interface is programmed under the influence of the stored initialization parameters; and
   a removable template (i) positioned on the touch sensitive screen and dimensioned to overlay said second touch zone of said touch sensitive screen, (ii) made of a low-glare material so as to not interfere with operation of said touch sensitive screen, and (iii) including printed indicia which function as an array of user selectable buttons for identifying said user input areas of the second touch zone.

9. The workstation of claim 8 further comprising a network port, wherein said network port includes telemetry circuitry permitting said workstation to communicate with a network while remaining physically separated from said network.

10. The workstation of claim 9 wherein said touchscreen is resistive.

11. A method for receiving user input an industrial environment, said method including:
    providing a display including a unitary display screen on which computer-generated visual images are provided and a border area located outside of the display screen, the border area being incapable of displaying said computer-generated visual images;
    positioning a single-piece touch sensitive screen dimensioned to cover said display screen and said border area on the display, such that a first touch zone of said touch sensitive screen covers said display screen and a second touch zone of said touch sensitive screen covers the border area;

defining user input areas in said first and second touch zones to receive input from a user;

positioning a removable template on said touch sensitive screen, said template being dimensioned to overlay said second touch zone, said template being made of a low-glare material so as to not interfere with operation of said touch sensitive screen, and including printed indicia which function as an array of user selectable buttons for identifying said user input areas of said second touch zone; and receiving input from the user via said touch sensitive screen.

12. The method of claim 11 further including the step of communicating with a server on a network in response to selected input.

13. The method of claim 12 further including the step of protecting said touchscreen from adverse environmental conditions.

14. The method of claim 13 further including the step of temporarily redefining an area of said touchscreen to receive user input and of repartitioning said touch sensitive screen to change the position and size of one of said user input areas.

15. A computer workstation, comprising:

a display including a unitary display screen on which computer-generated visual images are provided and a border area located outside of the display screen, the border area being incapable of displaying said computer-generated visual images;

a single-piece touch sensitive screen dimensioned to cover the display screen and the border area, the touch sensitive screen including a border touch zone covering the border area and a much signal output responsive to said border touch zone;

an input interface responsive to said touch signal output of said touch sensitive screen, said input interface being programmable to partition said border touch zone into user input areas having programmable sizes and positions within said much sensitive screen; and a removable template (i) positioned on the touch sensitive screen and dimensioned to overlay said second touch zone of said touch sensitive screen, (ii) made of a low-glare material so as to not interfere with operation of said touch sensitive screen: and (iii) including printed indicia which function as an array of user selectable buttons for identifying said user input areas of said second touch zone.

16. An industrial computer workstation, comprising:

a reinforced case sealed to exclude industrial contaminants from entering said case, said case being reinforced to an extent sufficient to withstand a level of impact significantly higher than that which would normally be encountered in shipping and office use:

a display including a unitary display screen, supported by said case, on which computer-generated visual images are provided and a border area located outside of the display screen, the border area being incapable of displaying said computer-generated visual images;

a single-piece touch sensitive screen supported by said case and dimensioned to cover said display screen and said border-area, said touch sensitive screen having a first touch zone covering said display screen, a second touch zone covering the border area and a signal output responsive to said touch zones;

an input interface contained in said case, said input interface being responsive to said touch signal output of said touch sensitive screen, said input interface being programmable to define portions of said touch zone as user input areas of said touch sensitive screen;

a removable template (i) positioned on the touch sensitive screen and dimensioned to second touch zone of said touch sensitive screen, (ii) made of a low-glare material so as to not interfere with operation of said touch sensitive screen, and (iii) including printed indicia which function as an array of user selectable buttons for identifying said user input areas of said second touch zone; and a general-purpose processor contained in said case, said processor being programmable to run user application software including general-purpose software, and wherein said input interface is operable to provide indications of user interaction with said user input areas of said touch sensitive screen to the user application software running on said processor, said display being responsive to said processor.

* * * * *